Patented Feb. 4, 1936

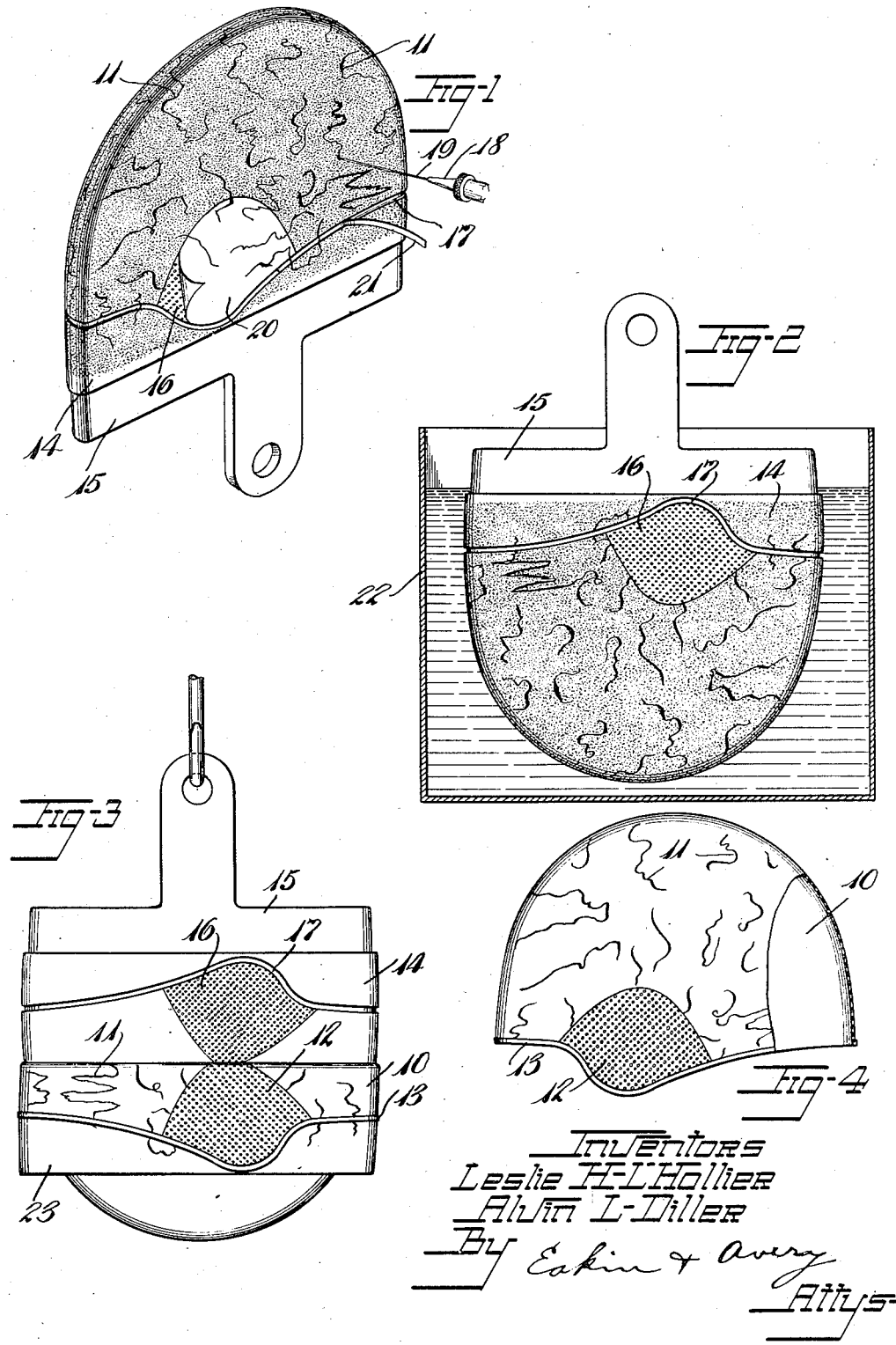

2,029,379

UNITED STATES PATENT OFFICE 2,029,379

METHOD OF MAKING ORNAMENTED RUBBER ARTICLES

Leslie H. L'Hollier, Waltham, and Alvin L. Diller, Belmont, Mass., assignors to Hood Rubber Company, Inc., Watertown, Mass., a corporation of Delaware Application February 27, 1934, Serial No. 713,166

3 Claims. (Cl. 18—58)

This invention relates to the manufacture of ornamented rubber articles.

The chief objects of the invention are to provide a rubber article that has an attractive gossamer or veined or other design in its surface, and to provide improved procedure for ornamenting rubber surfaces.

These and further objects will be apparent from the following description, reference being had to the accompanying drawing, in which:

Fig. 1 is a perspective view of a building form in the course of preparation for producing an article in accordance with the invention in its preferred form.

Fig. 2 is an elevation of the prepared form immersed in a rubber-dispersion tank, the latter being shown in vertical section.

Fig. 3 is an elevation of the form with a formed article partly stripped therefrom.

Fig. 4 is an elevation, with a part broken away and sectioned, of the completed article.

The invention is applicable to the production of many rubber articles, the bathing cap of Fig. 4 being chosen for illustration. The cap 10 comprises rubber of one color having a gossamer or veined design 11 of rubber of another shade or color in its outer surface, although various other design effects are made possible by the procedure of the invention. The cap comprises also an ornamental ear portion 12 and a marginal bead 13, all provided as an integral, molded structure.

The surface of the article is ornamented by a procedure which, according to the preferred form, comprises depositing a colored rubber dispersed in a liquid carrier upon a supporting surface or form in fine threads, which may be effected by ejecting the rubber solution or dispersion through a suitable nozzle while the latter is moved about over the surface, and molding upon this a layer of rubber of a different color or shade to form the body of the article, and removing the same from the support with the threads of rubber constituting a part of the surface of the article. In order that the deposited threads of rubber solution will not spread undesirably on the supporting surface, but instead will retain their gossamer form, and in order that these threads will not adhere objectionably to the supporting surface, but rather, will adhere preferentially to the rubber deposited upon it, the supporting surface may be coated, prior to the application of the threads of rubber, with a substance that is not easily wetted by the liquid carrier of the rubber and that acts as a lubricant between the supporting surface and the threads. This coating is not essential in all cases and may be omitted entirely where the surface of the support itself is such that the deposited rubber does not spread objectionably upon it or adhere too strongly to it.

It is preferred that the liquid carrier of the rubber of the threads be one of the hydrocarbon liquids ordinarily used as a rubber solvent, and with use of such liquid carrier the form-coating substance, in case such substance is used, may be an aqueous solution of sugar or soap, which is preferably permitted to dry substantially upon the supporting surface before the threads of rubber solution are deposited upon it. Other coating substances also are suitable for the purpose, such for example as glue or other gelatinous substance. In case it is desired to deposit the rubber of the threads in an aqueous carrier rather than a solvent carrier, the supporting surface may be coated with a substance not easily wetted by water, such for example as wax or paraffin.

Referring to Fig. 1, a male-negative cap form 14, which may be of any suitable material, but preferably of rubber formed as a hollow "sock" mounted upon a support 15 is formed with an embossed ear portion 16 and a bead forming groove 17.

In case the form is to be coated as above described, that may be effected, as by spraying or dipping and drying. The ornamenting rubber may be then applied by ejecting the rubber dispersion in a fine-thread-like stream by means of a suitable nozzle 18 which is moved about over the surface to make the design, or by ejecting the dispersion into the air where it "strings out" into threads before falling upon the surface in chance design, or in any other suitable manner.

In case it is desired to apply this ornamentation upon only a limited area, for example to the entire surface except the ear portion 16 and the bead 17, the latter portions may be shielded as by means of masks 20 and 21, respectively, of sheet material temporarily adhered to the form 14.

The deposits of rubber solution on the coated form are permitted to dry, at least partially, and then, after the masks 20 and 21 have been removed, the rubber of the cap body is deposited upon it, preferably by immersing the structure in a tank 22 of a dispersion of the rubber, preferably an aqueous dispersion, the deposition being assisted preferably by means of a coagulant.

When a sufficiently thick deposit of the rubber has been deposited upon the form, the latter with the deposit is removed from the tank, and after the deposit has been dried, and preferably also vulcanized, and the excess portion 23 (Fig. 3) beyond the bead 13 trimmed off, the cap is stripped from the form and turned inside out, as shown in Fig. 3, to provide the complete article of Fig. 4 with the rubber threads 11, 11 embedded in and bonded to the surface of the cap body in substantially the same arrangement they were deposited upon the form, constituting in the surface of the cap the desired gossamer or other design.

If desired, a speckled, mottled or other design, either in association with or substituted for the veined design, may be effected by spraying or otherwise suitably depositing the liquid dispersed ornamenting rubber upon the form prior to the deposition of the rubber of the article body.

We claim:

1. The method of producing an ornamented rubber article which method comprises depositing liquid dispersed rubber in a fine thread-like stream upon a supporting surface not easily wetted by the liquid of the dispersion so that the deposit does not spread from the thread-like form in which it is initially deposited, depositing thereupon a layer of rubber of a contrasting appearance and removing the said layer with the thread-like deposit adhered to the surface thereof.

2. The method of producing an ornamented hollow rubber article which comprises depositing liquid dispersed rubber in a fine thread-like stream upon a form coated with a substance not easily wetted by the liquid of the dispersion to provide a gossamer design, depositing thereupon a layer of rubber of a contrasting appearance from a liquid dispersion of the latter, drying the deposited structure, and removing it from the form and turning it inside out to present the gossamer designed surface thereof as an outer surface of the article.

3. The method of producing an ornamented rubber article which comprises ejecting liquid dispersed rubber from a nozzle onto a supporting surface to form a gossamer design, depositing thereupon a layer of rubber of a contrasting appearance and removing the said layer with the rubber of the design adhered to the surface thereof.

LESLIE H. L'HOLLIER.
ALVIN L. DILLER.